US007945858B1

(12) United States Patent
Bisque et al.

(10) Patent No.: US 7,945,858 B1
(45) Date of Patent: May 17, 2011

(54) SYSTEM AND METHOD FOR CONTROLLING AND OPERATING AN ASTRONOMICAL OBSERVATORY

(75) Inventors: Stephen M. Bisque, Golden, CO (US);
Thomas M. Bisque, Golden, CO (US);
Daniel R. Bisque, Golden, CO (US);
Matthew L. Bisque, Golden, CO (US)

(73) Assignee: Software Bisque, Golden, CO (US)

( * ) Notice: Subject to any disclaimer, the term of this patent is extended or adjusted under 35 U.S.C. 154(b) by 447 days.

(21) Appl. No.: 12/002,413

(22) Filed: Dec. 17, 2007

(51) Int. Cl.
G06F 3/00 (2006.01)

(52) U.S. Cl. ......... 715/738; 715/789; 715/811; 700/245

(58) Field of Classification Search .................. 715/736, 715/734, 743, 740, 738, 789, 811; 33/1 SC; 359/368, 376, 399; 709/203, 224; 700/245
See application file for complete search history.

(56) References Cited

U.S. PATENT DOCUMENTS

2002/0173877 A1* 11/2002 Zweig ........................ 700/245
* cited by examiner Primary Examiner — Ba Huynh
Assistant Examiner — Mylinh Tran
(74) Attorney, Agent, or Firm — Edwin H. Crabtree; Ramon L. Pizarro

(57) ABSTRACT

A system for operating an astronomical observatory made up of astronomical hardware, utilizing a web browser operated by a user, and a web server connected to the observatory, wherein both the control to, and feedback from the observatory are displayed to the user in real time independent of personnel support at the observatory site. The user submits a request to the observatory via the web browser, which displays the status and results of the request. A web server, coupled to the various astronomical hardware, processes the request on behalf of the user and responds with the status and results of the request. The status and/or results are then displayed by the web browser to the user. Requests may be made by the user interactively, or in the form of a script. The system may be used over wide area networks, like the Internet, or any other type of network.

16 Claims, 6 Drawing Sheets

SYSTEM AND METHOD FOR CONTROLLING AND OPERATING AN ASTRONOMICAL OBSERVATORY

RELATED APPLICATIONS

This continuation patent application claims the benefit of a provisional patent application Ser. No. 60/264,302, filed on Jan. 29, 2001 by the subject inventors and having a title of "SYSTEM AND METHOD FOR OPERATING AN OBSERVATORY USING A WEB BROWSER", and a non-provisional patent application Ser. No. 10/041,971. filed on Jan. 2, 2002 by the subject inventors and having a title of "SYSTEM FOR OPERATING AN ASTRONOMICAL OBSERVATORY IN REAL TIME USING HTTP"

BACKGROUND OF THE INVENTION

1. Field of the Invention

This invention relates to controlling an astronomical observatory by means of a web browser and web server communicating by an http protocol and more particularly, but not by way of limitation to controlling an astronomical observatory wherein a user, by means of the web browser, may manipulate the observatory either remotely or locally in real time and independent of personnel support located at the observatory site.

2. Discussion of the Prior Art

In U.S. Pat. No. 4,682,091 to Krewalk et al. a telescope control system is described. The control system found therein discloses the use of a microprocessor and a motor placed on each of two axis which makes it possible for an operator to receive digital information concerning the position of a telescope and further allow the operator to manipulate the telescope digitally.

U.S. Pat. No. 5,133,050 to George et al. discloses a system for operating a telescope wherein a graphical display representing the night sky maybe used by an operator to guide a telescope. In this system as the operator locates an object on the graphical display the telescope processes the objects location and automatically points to its coordinates.

In U.S. Pat. No. 6,304,376 to Baun et al. a fully automated telescope system with distributed intelligence is described combining a telescope with a controlling processor unit such as a computer wherein, once the geographic location of the telescope has been ascertained, the telescope will automatically point to or track any object in the sky.

None of the above mentioned prior art patents specifically disclose the unique features of the subject system for controlling an astronomical observatory in real time by means of a web browser and web server communicating by way of an http protocol.

SUMMARY OF THE INVENTION

In view of the foregoing, it is a primary object of the invention to provide real time control of an astronomical observatory to a user independent of personnel support at the observatory site.

Another object of the present invention is to provide access to an astronomical observatory, made up of expensive astronomical equipment, to users that would be precluded from using such equipment because of cost.

Still another object of the system for web browser control of an astronomical observatory is to give a user an opportunity to remotely observe a night sky other than the one under which he/she is located. This would allow the user to perform observations during daytime hours and would permit the user to control equipment in areas with less light pollution than is present at his/her locale.

Yet another object of the system is to allow a user to control an astronomical observatory over a network such as the internet using standard internet protocols in order to allow communication between the user and the astronomical observatory to pass freely through corporate firewalls without requiring auxiliary holes in the firewalls to be created.

An additional object of the invention is to allow a user to control an astronomical observatory via a web browser independent of any particular operating system, component technology, or object calling convention in order to allow for a maximum client reach.

A further object of the invention is to allow the user to control multiple observatories simultaneously, and to show as many spectators as desired the real time results coming from the observatories.

The subject system is used for controlling an astronomical observatory made up of astronomical hardware, utilizing a web browser operated by a user, and a web server connected to the observatory. Wherein both the control to, and feedback from the observatory are displayed to the user in real time and are independent of personnel support at the observatory site. The user submits a request to the observatory via the web browser. A web server, coupled to the various astronomical hardware, processes the request on behalf of the user and responds with the status and results of the request. These results and/or status are then displayed by the web browser to the user. Requests may be made by the user interactively, or in the form of a script. Since the system may be used over wide area networks, like the Internet, any other type of network, or even no network at all, the invention allows the user to control the observatory either remotely from a distance, or locally at the observatory site. In addition, the distributed nature of the system allows for the user to be in control of multiple observatories simultaneously, and permits any number of spectators to view the results coming from the subject observatories.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
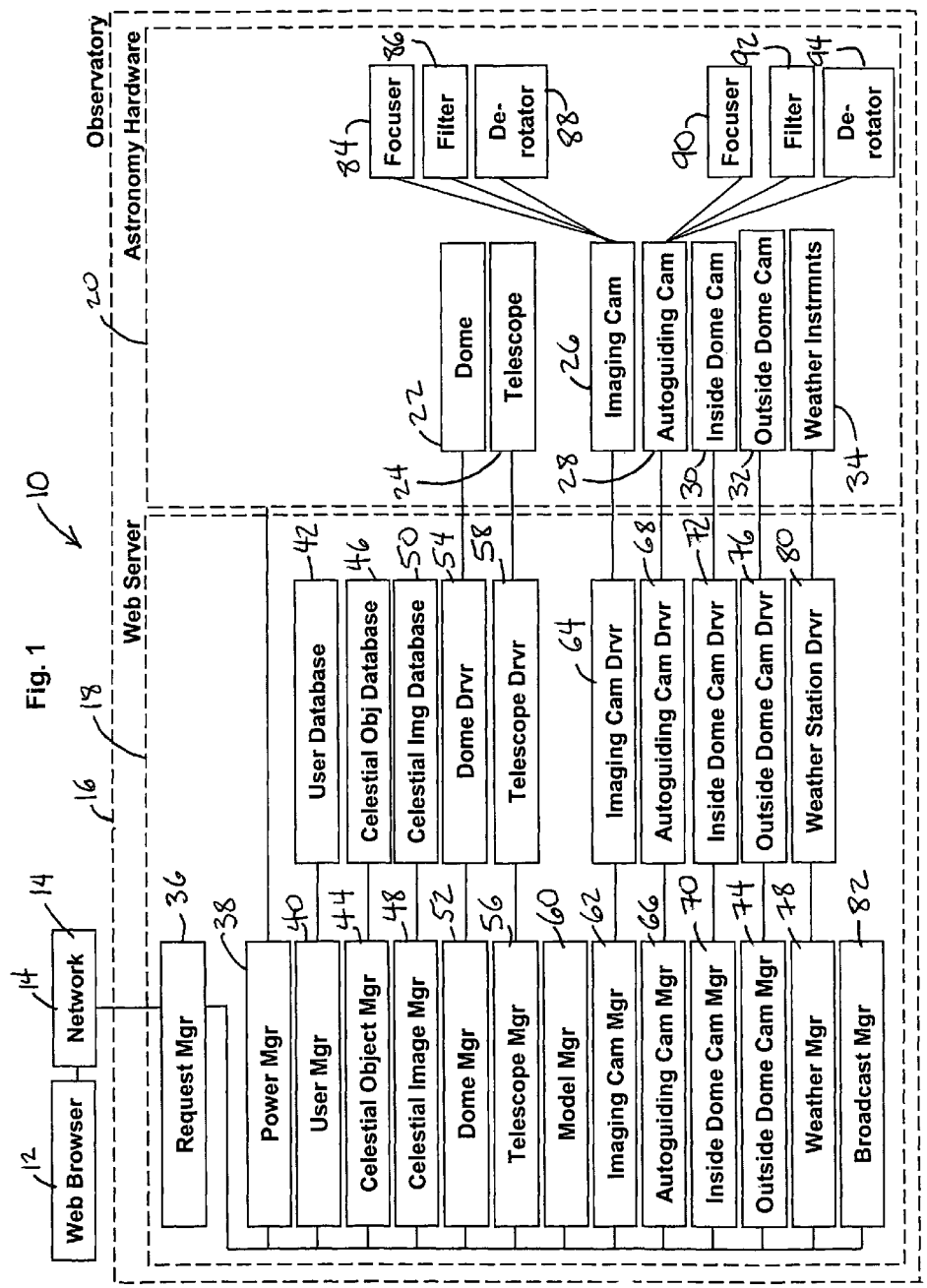
FIG. 1 is a diagram of an exemplary environment used to implement the present invention.

In FIG. 1, an exemplary environment of the present invention is shown having general reference numeral 10 wherein the environment 10, is made up of a web browser 12, a network 14, and an observatory 16. The elements of the observatory 16 may be broken down further into two distinct sets, the software included in the web server 18, and the astronomical hardware 20.

The web browser 12 provides a rich graphical user interface for a user to interact with the observatory 16 in a number of standard ways. The graphical interface could include features like an interactive, virtual star chart of the sky at the observatory 16 in order to simplify selection by the user of a desired target. The web browser 12 could further include interactive virtual models of various components of the astronomical hardware 20, such as, a dome 22 which provides a protective housing for the observatory 16. A telescope 24, made up of a telescopic optics system and a means for controlling the position of the telescopic optics system for the purpose of pointing to and tracking on celestial objects. An imaging camera 26 located at the telescope 24 and positioned for the purpose of capturing a digital image of a celestial object at which the telescope 24 is aimed. An auto-guiding camera 28 located at the telescope 24 and able to find a celestial object in the sky near the celestial body at which the telescope 24 is aimed for the purpose of providing the software with a set of reference images on which it may measure the necessary tracking adjustments as the telescope 24 moves across the sky. The astronomical hardware 20 further includes an inside dome camera 30, an outside dome camera 32, and a set of weather station instruments 34. The interface between the user and the observatory 16 could might also feature an image of a celestial object created by the imaging camera 26, at the request of the web browser 12, a wide angle view of the inside of the observatory 16 produced by the inside dome camera 30, and/or a wide angle view of the sky at the observatory 16, captured by the outside dome camera 32. In short, the function of the web browser 12 in the exemplary environment 10 is to, at the behest of the user, make requests using an http protocol to the observatory 16, and display the results of requests received from the observatory 16 by means of an http protocol. These requests being carried out by the web server 18 and the astronomical hardware 20. To one skilled in the art it would be obvious that an https protocol would fall into a sub category of http protocols. Consequently, it is assumed that any components in the system described as using an http protocol for communicating could alternatively be utilizing an https protocol without departing from the present invention. Furthermore, those skilled in the art will recognize that the list of possible features located at the web browser 12 are not in any way limiting, and that the functionality of the web browser 12 could be larger or smaller without departing from the scope of the present invention.

The web server 18, as depicted in the exemplary environment 10, includes the software that makes operating the astronomical hardware 20 possible. This list of software includes a request manager 36, a power manager 38, a user manger 40 connected to a user database 42, a celestial object database manager 44 which controls a celestial object database 46, a celestial image database manager 48 connected to a celestial image database 50, a dome manager 52 attached to a dome driver 54 which controls the dome 22, a telescope manager 56 linked to a telescope driver 58 that feeds requests to the telescope 24, a telescope model manager 60, an imaging camera manager 62 and an imaging camera driver 64 that control the imaging camera 26, an auto-guiding camera manager 66 and an auto-guiding camera driver 68 which are connected to the auto-guiding camera 28, an inside dome camera manager 70 electronically linked to an inside dome camera driver 72 and the inside dome camera 30, an outside dome camera manager 74 attached to an outside dome camera driver 76 that passes requests to the outside dome camera 32, a weather station manager 78 and a weather station driver 80 coupled to the weather station instruments 34, and a broadcast manager 82.

The request manager 36 is responsible for listening for and responding to web browser 12 requests. The request manager 36 also queues requests while other requests is are in progress, allowing the user to control the observatory 16 in a scripted manner. All requests from the web browser 12 have an associated timeout and are closed loop. Whenever a request'fails, the web browser 12 is informed of the failure along with a descript status of the failure. When a request succeeds, the status of the request along with its results are presented to the web browser 12 by way of the request manager 36 using an http protocol.

The power manager 38 provides the means for the web browser 12 to power on or off, any or all of the astronomical hardware 20 located at the observatory 16. The access to power operations via the web browser 12 would normally be reserved for users with administrative privileges. This is due to fact that the ability to power devices is primarily for startup and shutdown. In the case of a problem with a particular component of the astronomical hardware 20 power operations might also be necessary to "reboot" the device by toggling its power.

The user manager 40 is the gate by which users must gain entrance if they wish to control the observatory 16 via the web browser 12. As the user attempts to login the user manager 40 locates the users account in the user database 42 and gives the user the privileges permitted by his/her account. The user manager 40 further controls the scheduling of advance dates and times by users for manipulating the observatory 16. Under most circumstances the user manager 40 would allow only one user at a time to control the observatory 16 to avoid conflicting requests from multiple users, however, simultaneous operation by multiple users is possible, and the status of and results of the requests made by one user could be made available to any number of other users via the broadcast manager 82.

The celestial object database manager 44 provides access to the celestial object database 46. Through the celestial object database manager 44 the user can get either ephemeris or graphical data for celestial objects including but not limited to galaxies, minor planets, planets, satellites and stars for any field of view, for any date and time.

The celestial image database manager 48 is the means by which the user may obtain data from the celestial image database 50. The celestial image database 50 contains a set of reference images that cover the entire night sky. This information is essential for certain types of discovery work like supernova and minor planet discovery. When acquiring an image of a celestial object, the web browser 12 could also receive an optional accompanying image from the celestial image database 50 for reference.

The dome manager 52 controls the dome 22 with communications interpreted by the dome driver 54. This control includes the ability to request the current position of the dome and to open or close the dome slit, or in the case of a roll roof or the equivalent, open or close the roof. Control further includes being able to slew the dome 22 or to track the dome 22, and to compute the required altitude and azimuth of the dome slit with respect to the telescope. This last task, although it may sound trivial, is quite complicated. This is because different types of telescopes and mounts have rotating axis which are not located at the rotational center of the dome 22. The dome manager 52 is able to take into account the geometry of both the telescope 24 and the dome 22 and automatically align the dome slit with the direction in which the telescopic optic is aimed.

The telescope manager 56 sends directions to the telescope 24 via the telescope driver 58. These directions could include both startup and shutdown instructions for the telescope 24. The communication between the telescope manager 56 and the telescope 24 further contains the ability to get and set the current position of the telescope 24, as well as the capability of providing the telescope 24 with a direction in which to slew.

The telescope model manager 60 is responsible for quantifying systematic errors inherent in the telescope 24. These errors include but are not limited to offset or bias errors, polar misalignment, refraction, non-perpendicular axis, gear errors, tube flexure, and fork flexure. In order to quantify the previously listed errors the telescope model manager 60 utilizes a process called mapping. Mapping involves pointing the telescope 24 at a sufficient number of celestial objects, over a sufficient portion of the sky, and then noting the difference between where the telescope 24 was directed to point and where it actually went. Once a model taking into account these pointing errors is in place the telescope model manager 60 is the means whereby coordinates submitted by the user may be converted to model coordinates which are then used to insure that the telescope 24 will point in the proper direction. Additionally, the model is used by the telescope model manager 60 to make adjustments in the tracking rate of the telescope 24, accounting for the same systematic errors.

The imaging camera manager 62 and the auto-guiding camera manager 66 are responsible for controlling the imaging camera 26 and the auto-guiding camera 28 respectively. The instructions from the camera managers 62 and 66 are sent by way of the imaging camera driver 64 and the auto-guiding camera driver 68. All the functionality to operate the cameras 26 and 28 are provided in the camera managers 62 and 66. Operation at a minimum would include the ability to acquire an image. Other operations, like regulating the temperature, bin mode, etc. of the cameras 26 and 28 would also be done by the camera managers 62 and 66. The imaging camera manager 62 and the auto-guiding camera manager 66 also serve as image processing programs and are able to perform various image reductions on acquired images, such as account for dark, flat, and bias frames. The imaging camera manager 62 further provides access to an imaging camera focuser 84, an imaging camera filter wheel 86, and an imaging camera field de-rotator 88. The auto-guiding camera manager 66 likewise is the means for controlling an auto-guiding camera focuser 90, an auto-guiding camera filter wheel 92, and an auto-guiding cameral field de-rotator 94.

The inside dome camera manager 70 and outside dome camera manager 74 control the inside dome camera 30 and outside dome camera 32 via the inside dome camera driver 72 and the outside dome camera driver 76 respectively. Any and all function performed by the dome cameras 30 and 32 are controlled by the dome camera managers 74 and 74. Typically the dome cameras 30 and 32 would provide a wide-angle view of the inside and outside of the observatory 16 that would be available to the web browser 12, or any other software manager in the observatory 16.

The weather station manager 78 controls and monitors the weather station instruments 34 through the weather station driver 80. Both the real-time and archived status of weather conditions, for example, wind speed, outside temperature, inside temperature, air pressure, and/or humidity, would be available to the web browser 12 through the weather station manager 78.

The present invention specifically addresses the problem of how to make the results and status of observatory in operation available to multiple clients. The nature of observatory control lends itself to control by a single user at the web browser 12. However, the results and status of requests made on behalf of this "primary user" can be made available to any number of other users. In the subject invention it is of the utmost importance that the primary user receive status and results in a timely manner. To accomplish this, broadcasting is done on a lower priority and on a completely separate process (or even CPU) from the primary user. In this way, when the primary user is in control of the observatory 16, the system will not hang or get bogged down by broadcasting to multiple clients. Instead, copies of status and results are made available to any number of "viewers" through a separate lower priority process than that of the primary user. The broadcast manager 82 is able to broadcast results in any number of ways including through other web servers, file transfer servers, gopher, email, fax, modem, etc., etc.

Of course those skilled in the art will recognize that the exemplary environment 10 is not intended to limit the scope of the present invention. For example, the web browser 12 could be run on the same computer as the web server 18, eliminating the need of the network 14. Moreover, the distributed nature of the software components, any combination of computer to component could be used. For example, each of the drivers for the astronomical hardware 20 could be run on a separate computer. In the exemplary environment 10 the core or majority of the processing is done on the server computer. This allows the client side processing to be simple and thus increase the reach of observatory control to the broadest audience possible. Those skilled in the art will recognize that other or alternative environments could be used without departing from the spirit of the current invention.

Figure 2:
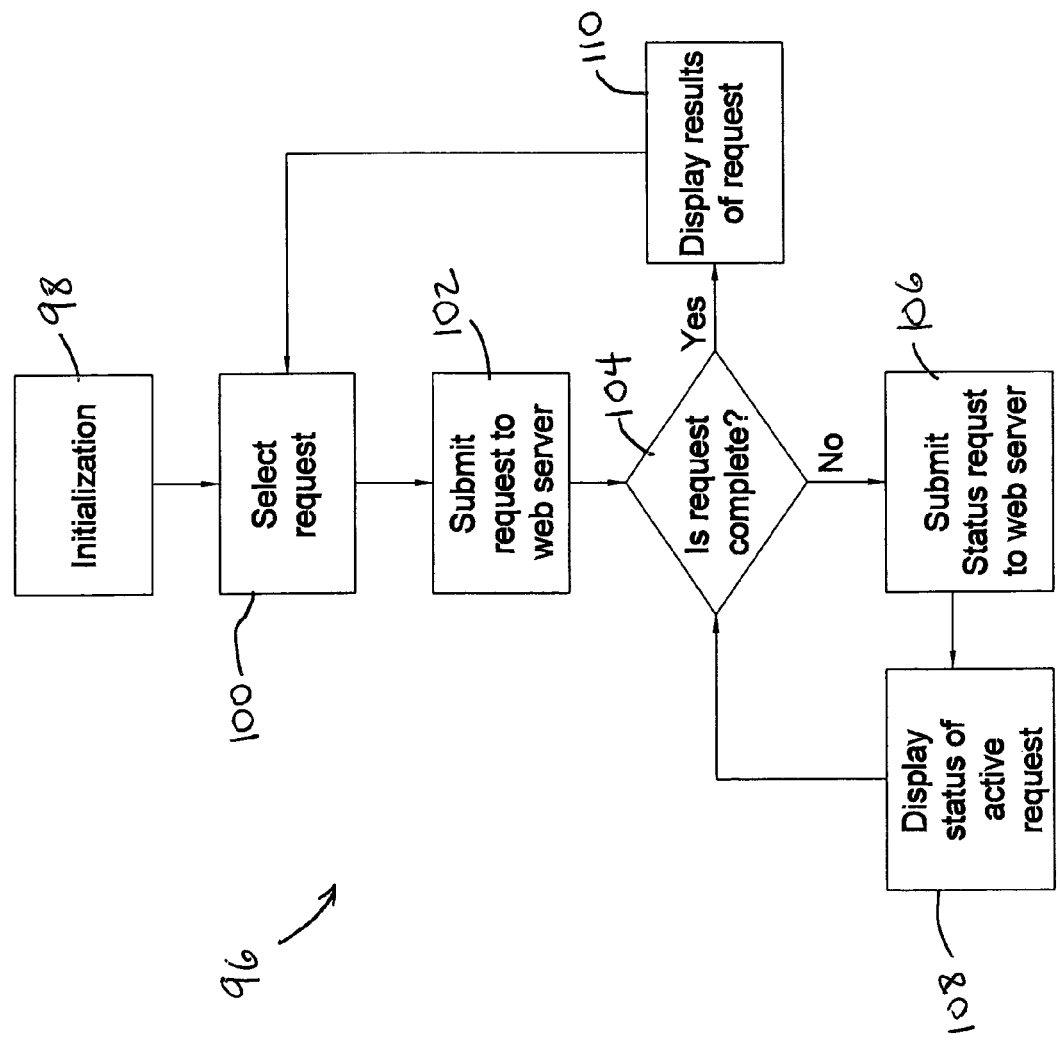
FIG. 2 is a flowchart showing the general logic of a web browser performing the steps of the subject invention.

In FIG. 2 a flowchart of the general logic of the web browser 12 with reference numeral 96 is shown, wherein the web browser 12 is submits a request to the web server 18 and then displays the status and/or results of the request. The first block in the flowchart 96 is an initialization block 98. In the initialization block the web browser 12 is initialized. The user then selects a request, symbolized by a select request block 100, and the selected request is submitted to the web server 18 shown as a submit request to web server block 102. Whether or not the request submitted in the submit request to web server block 102 has been completed is then evaluated by a request completion decision tree 104. If the request is not finished then the web browser 12 submits a status request to the web server in a submit status block 106. The status of the request is then displayed by the web browser 12 in a display status block 108, at which point the system returns to the request completion decision tree 104. If the request submitted to the web server 18 in the submit request to web server block 102 has been completed then the results of the request are displayed in a display results block 110.

The loop represented by blocks 104, 106, and 108 is a traditional client poll method to determine the status of an ongoing request. The client poll method is shown here for simplification, other methods for determining the status of an ongoing request, such as server push, could be used. However, client poll, as a common platform independent method, would likely allow for a simple web browser 12 and a more sophisticated web server 18, resulting in maximum client reach.

Figure 3:
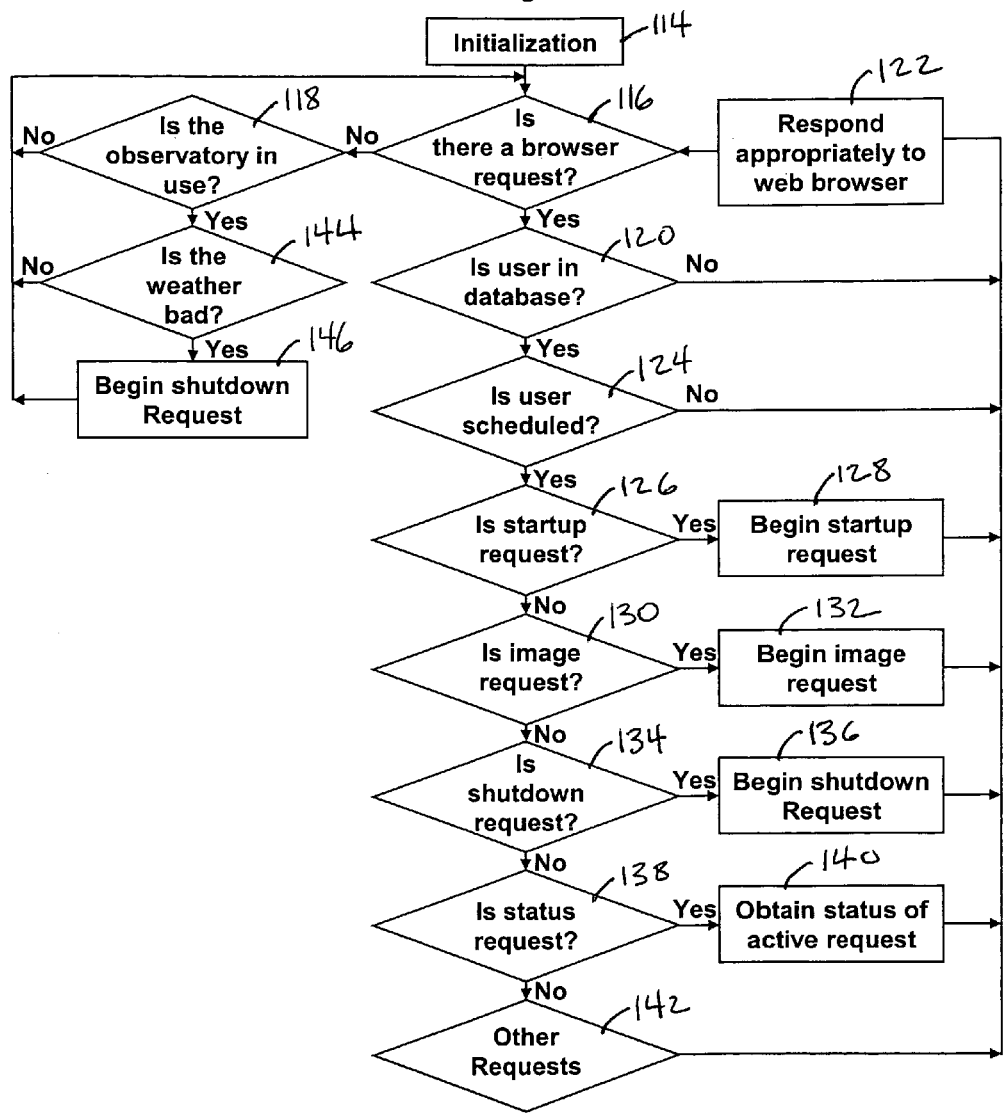
FIG. 3 is a flowchart wherein the general logic of a web server performing the steps of the current invention is shown.

Referring now to FIG. 3, a flowchart of the general logic of the web server 18 having general reference numeral 112 is shown, wherein the flowchart 112 represents the general logic used by the web server to process a request made by the web browser 12. The flowchart 112 begins with an initialization block 114, which represents the initialization of the web server 12 and manager components including the power manager 38, the user manager 40, the celestial object database manager 44, the celestial image database manger 48, the dome manager 52, the telescope manager 56, the telescope model manager 60, the imaging camera manager 62, the auto-guiding camera manager 66, the inside dome camera manager 70, the outside dome camera manager 74, the weather station manager 78, and the broadcast manager 82.

The next step in the flowchart 112 is a browser request decision tree 116 which determines if the request manager 36 has received a request from the web browser 12. If a request has not been received then control is transferred to an observatory usage decision tree 118. If a request is present then control is transferred to a user identification decision tree 120 where the identity and profile of the user are searched for by the user manager 40 in the user database 42. If the user is not found in the user database 42 then control is transferred to a request response block 122, at which point an appropriate response is sent to the user via the web browser 12. If the user is found, then the system continues to a user schedule block 124 at which point the user manager 40 determines if that user is scheduled to have control of the observatory 16 at that time. If the user is not scheduled then the system responds at the request response block 122. Should the user be scheduled properly then control passes to a startup request decision tree 126. At the startup request decision tree 126 the request manager 36 evaluates whether the request is a startup request. If the request is a startup request then the request is executed at a startup request block 128. Should the request not be a startup request, the system then proceeds to an image request decision tree 130, where the request manager 36 sends image requests to a image request block 132 to be carried out, and alternative requests to a shutdown request decision tree 134 which also takes place in the request manager 36. The function of the shutdown request tree 134 is to, in case of a shutdown request, send the system to a shutdown request block 136, where the system is shutdown. In the case that the request is not a shutdown request, the shutdown request decision tree 134 transfers control to a status request decision tree 138. For the case that the request is a request from the web browser 12 regarding the status of a previous request then the requested status is obtained at a status request block 140. If the request is not a status request then the system proceeds to an other request decision tree 142. This other request decision tree 142 represents the request manager 36 routing other requests. These requests might include any portion of operations in the startup, image, and shutdown requests or any other operation involved in controlling the observatory 16.

Returning now the observatory usage decision tree 118, here the request manager 36 determines if the observatory 16 is in use. If the observatory 16 is in use then control is given to a weather decision tree 144, at which point the weather station manager 78 determines is the weather conditions at the observatory 16 are acceptable for observation. If weather conditions are not conducive to observatory 16 usage then the system proceeds to a shutdown request block 146 which is identical in function to the shutdown request block 136.

Figure 4:
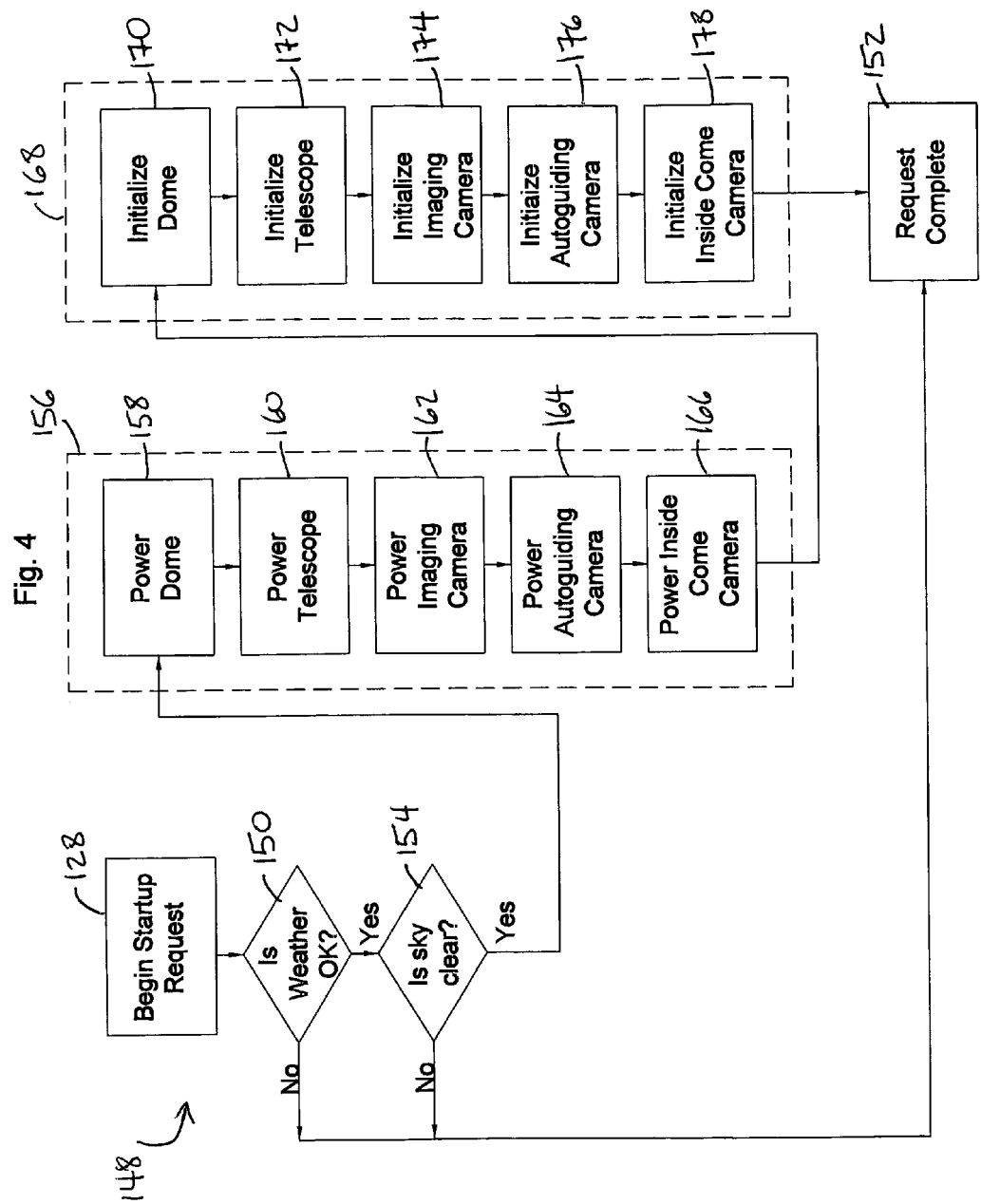
FIG. 4 is flowchart of the general logic of a web server performing the steps of the observatory startup procedure.

FIG. 4 shows a flowchart 148 of the general logic of the web server 18 while performing a startup request. The flowchart 148 begins with the startup request block 128. The system is then directed to a weather decision tree 150 where the weather station manager 78 determines if weather will allow the observatory 16 to be operational. Configurable options allow for specifying tolerable values for different weather variables such as wind speed, outside temperature, barometric pressure, humidity and dew point. If the weather is bad then the system is transferred immediately to a request complete block 152 without completing any further startup procedures. If the weather is acceptable then the system proceeds to a clear sky decision tree 154.

At the clear sky decision tree 154, whether or not the sky is clear enough to observe is determined by the outside dome camera manager 74. The outside dome camera manager 74 accomplishes this by acquiring a wide-angle view of the sky from the outside dome camera 32 and comparing the stellar pattern of that image with a virtual stellar pattern generated by the celestial object database manager 44. If the picture from the outside dome camera 32 matches the virtual image without too many obstructions then the sky is clear and the system proceeds to a set of hardware power ups 156.

The first step in the set of hardware power ups 156 is a power dome block 158 which represents the power manager 38 powering the dome 22. Next a power telescope block 160 symbolizes the power manager 38 powering the telescope 24. The system is then controlled by a power imaging camera block 162 which depicts the power manager 38 powering the imaging camera 26. The power manager 38 then powers the auto-guiding camera 28 at a power auto-guiding camera block 164. The last power up in the set of hardware power ups 156 is performed by the power manager 38 as it powers the inside dome camera 30, which is represented by a power inside dome camera block 166.

After the set of hardware power ups 156 the system then progresses to a set of hardware initializations 168. The initialization procedures contained in the set of hardware initializations 168 are specific for each piece of hardware. They are one-time procedures that prepare the hardware to be ready for use from a recently powered up state. For simplification initialization is shown as a serial process, however, one skilled in the art could also accomplish them as a set of asynchronous processes wherein control is not continued until all initializations are complete.

The first block shown in the set of hardware initializations 168 is an initialize dome block 170. This signifies the dome manager 52 initializing the dome 22 and preparing the dome 22 for use. Any device specific commands necessary to make the dome 22 ready for use from a powerless state are performed here. For example, the dome 22 would be instructed to find its home sensors and be set to its home position. In addition the dome slit would be opened, or, in the case of a roll off roof or its equivalent, the roof would be opened.

As the set of hardware initializations 168 continues the system advances to an initialize telescope block 172. At the initialize telescope block 172 the telescope manager 56 initializes the telescope 24 and provides the telescope 24 with any and all commands necessary to make it useful from a powerless state. An illustration of this would be instructing the telescope 24 to find its home sensors and be set to its home position.

At an initialize imaging camera block 174 the imaging camera 26 is initialized by the imaging camera manager 62. Here the imaging camera manager 62 would give instructions like: cool to a desired temperature, to the imaging camera 26. These instructions given by the imaging camera manager 62 allow the imaging camera 26 to become useful from a recently powered up state.

As the system reaches an initialize auto-guiding camera block 176 the auto-guiding camera manager 66 initializes the auto-guiding camera 28. At the initialize auto-guiding camera block 176 the auto-guiding camera manager 66 would give any commands necessary to the auto-guiding camera 28 in order to bring the auto-guiding camera 28 into a state of readiness from a recently powered up state.

The final block shown in the set of hardware initializations 168 is an initialize inside dome camera block 178. At the initialize inside dome camera block 178 the inside dome camera 30 is initialized by the inside dome camera manager 70 in a manner similar to the way in which the imaging and auto-guiding cameras 26 and 28 were initialized by the imaging camera and auto-guiding camera managers 62 and 66 in blocks 174 and 176. Upon completion of the set of hardware initializations 168 the system then proceeds to the request complete block 152 where the results of the startup request are sent back to the web browser 12.

Figure 5:
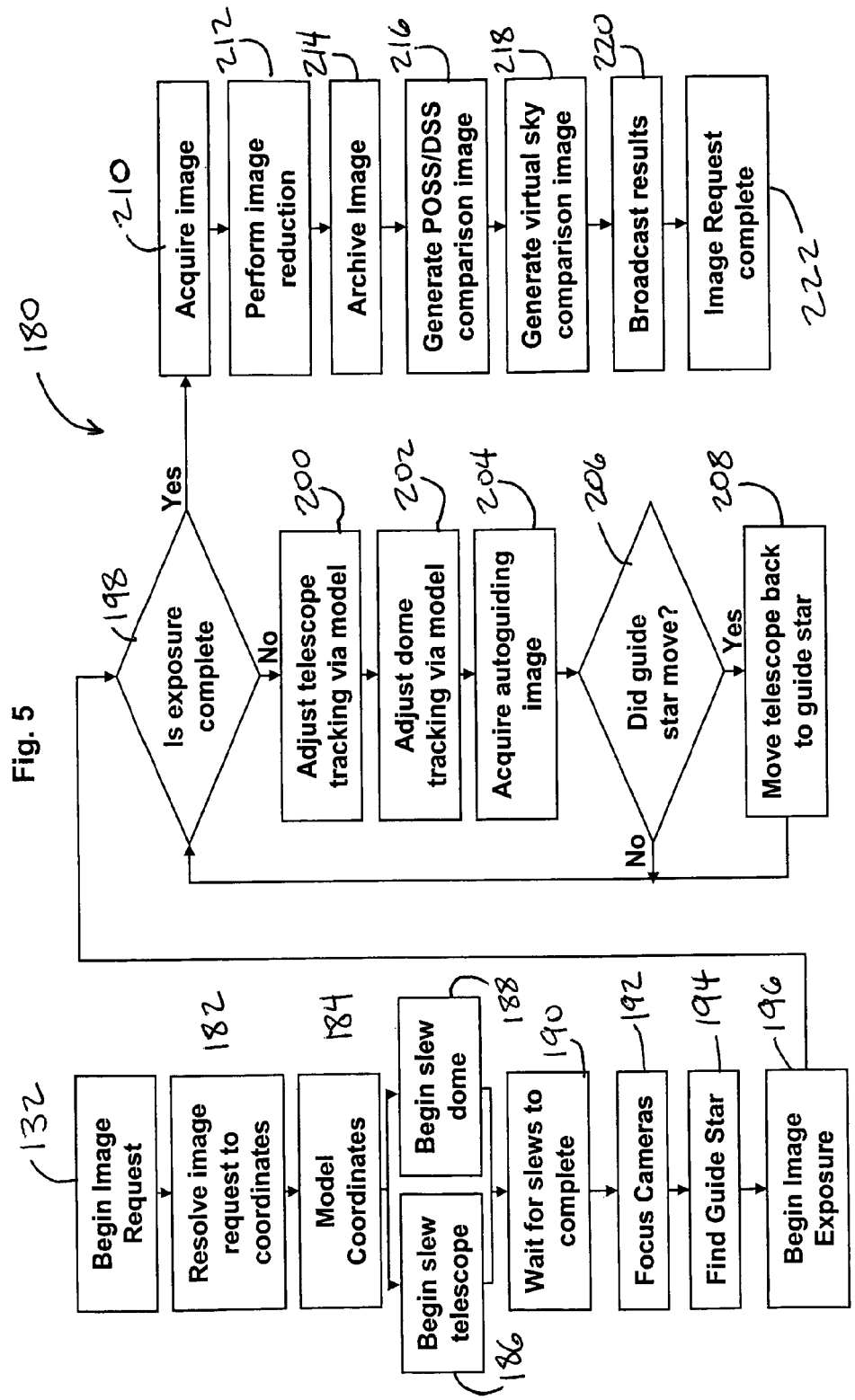
FIG. 5 is a flowchart featuring the general logic of a web server while executing the requisite steps for acquiring an image of a celestial object.

FIG. 5 depicts the general logic of the web server 18 performing the steps of an image request in a flowchart 180. The flowchart 180 is initiated by the image request block 132. Control of the system then continues to an image coordinate block 182 where the celestial object database manager 44 resolves a named based image request to celestial coordinates. Once these coordinates are obtained they are converted by the telescope model manager 60 into modeled coordinates. This process is represented by a model coordinates block 184 in the flowchart 180. The modeled coordinates created by the telescope model manager 60 take into account systematic errors inherent in the telescope 24. A telescope slew block 186 and a dome slew block 188 are then shown as occurring simultaneously. The telescope slew block 186 corresponds to the telescope manager 56 directing the telescope 24 to slew. The parameters of the slew are then converted to the appropriate form by the dome manager 52 and the dome 22 begins to slew at the rate necessary to keep from obstructing the view of the telescope 24. Upon completion of the slews control of the system is relinquished to a slew complete block 190 where the system waits for both the dome 22 and the telescope 24 to reach their final position before control passes to a focus camera block 192.

At the focus camera block 192 the imaging camera and auto-guiding camera managers 62 and 66 achieve focus in the imaging and auto-guiding cameras 26 and 28 respectively. One way to accomplish this is by converging on the maximum frequency content of several images acquired while adjusting the imaging camera and auto-guiding camera focusers 84 and 90.

Once focus is achieved the next step in the flowchart 180 is a find guide star block 194. The find guide star block 194 represents the task of the auto-guiding camera 28 acquiring a suitable celestial object to serve as a guide star. This is accomplished as the auto-guiding camera 28 varies exposure time (longer reveals dimmer stars) while the telescope 24 makes small positioning adjustments in order to bring known nearby stars, whose coordinates are supplied by the celestial object database manager 44, into view.

After an appropriate guide star has been located by the auto-guiding camera 28 the system begins to take the image requested by the user in a begin image block 196. At this point the imaging camera manager 62 selects a filter on the imaging camera filter wheel 86 and instructs the imaging camera 26 to begin the exposure. The parameters of the exposure, after leaving the imaging camera manager 62, are converted to the necessary form by the imaging camera driver 64, and sent to the imaging camera 26.

Now control of the system is passes to an exposure complete decision tree 198 where the imaging camera manager 62 determines if the exposure is complete. If it is not then the system is transferred to an adjust telescope tracking block 200. The adjust telescope tracking block 200 represents the telescope model manager 60 computing tracking adjustments for the position of the telescope 24 to account for the systematic errors present. These adjustments are then passed to the telescope manager 56 which implements them.

Once the telescope 24 tracking has been adjusted the necessary tracking corrections are passed to the dome manager 52 which then converts the corrections in order to keep the opening in the dome 22 aligned with the telescope 24. This process is represented in the flowchart 180 by an adjust dome tracking block 202.

The next block shown is an acquire auto-guiding image block 204. This symbolizes the auto-guiding camera 28 acquiring an image of the reference guide star. Once this is complete control of the system passes to a guide star movement decision tree 206, which represents the auto-guiding camera manager 66 determining if the guide star has moved with respect to its position in an earlier image. If the position of the guide star has not changed, then the system is transferred back to the exposure complete decision tree 198. However, if the position has changed then the progression of the flowchart 180 leads to a telescope correction block 208 where the telescope manager 56 moves the telescope 24 in order to correct the offset found in the guide star movement decision tree 206. Once this correction is complete, direction of the system is again shifted to the exposure complete decision tree 198.

If, at the exposure decision tree 198, the imaging camera manager 62 determines that the exposure is complete the system advances to an acquire image block 210, where the imaging camera manager 62 acquires the image from the imaging camera 26 by way of the imaging camera driver 64. As the system passes to a perform image reduction block 212 the imaging camera manager 62 makes a copy of the acquired image and reduces the copied image. After the image has been copied and reduced both the original and copied images are archived by the imaging camera manager 62 in an archive image block 214. Next the system continues to a generate comparison image block 216. Here the celestial image database manager 48 generates an actual image of the same portion of the sky that is captured in the image that was just taken. This comparison image is provided as an option to users who wish to have a frame of references for their image. The next step in the flowchart 180 is a generate virtual image block 218 where a virtual image of the portion of the sky captured by the user is generated from the celestial object database manager 44. Once all of the desired images have been generated they are made available to all other appropriate viewers as it becomes convenient for the web server 18, via the broadcast manager 82, as is represented by a broadcast results block 220. Finally, an image request complete block 222 signifies that the image request has been completed and the results and status of the request are sent to the web browser 12 in real time.

Figure 6:
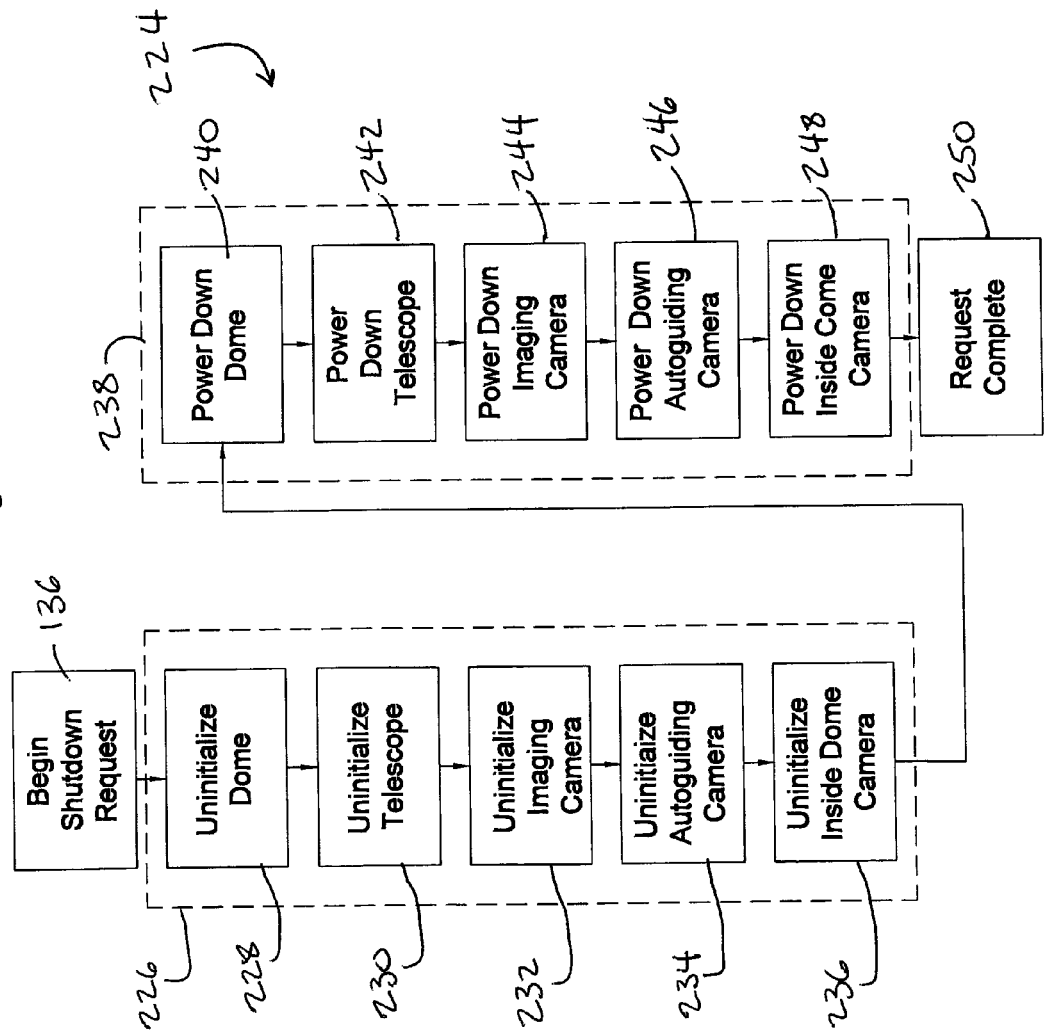
FIG. 6 is a flowchart showing the general logic of a web server performing the steps of the observatory shutdown procedure.

Referring now to FIG. 6, a flowchart 224 is shown, wherein the general logic of the web server 18 performing a shutdown request from the web browser 12 is represented. The first step in the flowchart 224 is the begin shutdown request block 136, which is functionally identical to the shutdown request block 146. Command of the system is then shifted to a set of hardware uninitializations 226.

As with the set of hardware initializations 168, the representation of these uninitializations is shown as a serial process with a specific order. It should be remembered that this is in no way out of necessity and that these processes could even be performed in parallel.

Presented in the flowchart 224 as the first step in the set of hardware uninitializations 226 is an uninitialize dome block 228, which represents the dome manager 52 giving the dome 22 any and all instructions prerequisite to the dome 22 being turned off. Such instruction could include rotating the dome 22 to its park position and closing its slit or roof.

The next block shown is an uninitialize telescope block 230 wherein the telescope manager 56 guides the telescope 24 through the procedures required for it to be powered down. An example of one such procedure would be slewing the telescope 24 to its park position.

Following the uninitialize telescope block 230 an uninitialize imaging camera block 232 is shown. The uninitialize imaging camera block 232 represents the imaging camera manager 62 causing the imaging camera 26 to perform such tasks as bringing the camera 26 to ambient temperature in preparation of having the power turned off.

In an uninitialize auto-guiding camera block 234 and an uninitialize inside dome camera block 236 the auto-guiding camera and inside dome camera managers 66 and 70 cause the auto-guiding and inside dome camera 28 and 30 to go through the steps necessary to prepare them to be powered down. These processes would be nearly identical to the instruction given the imaging camera 26 by the imaging camera manager 62 in the uninitialize imaging camera block 232.

Once the set of hardware uninitializations 226 is complete the system is then sent through a set of hardware power downs 238. The set of hardware power downs 238 are all performed by the power manager 38 of the system. The first power down shown is the power manager 38 cutting power to the dome 22 in a power down dome block 240. Next a power down telescope block 242 denotes the power manager 38 powering down the telescope 24. Then, in turn, a power down imaging camera block 244, a power down auto-guiding camera block 246, and a power down inside dome camera block 248 signify the power manager 38 shutting off the power to the imaging camera 26, the auto-guiding camera 28, and the inside dome camera 30, respectively. After the set of hardware power downs 238 is complete the control of the system is transferred to a request complete block 250 which represents the completion of the shutdown request.

While the invention has been particularly shown, described, and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A computer-implemented method of controlling an astronomical observatory with components that include at least an astronomical telescope, an imaging camera, and an auto-guiding camera, the method comprising:
    serving, over a network to a browser, an interface, wherein the interface comprises an interactive star chart that depicts the night sky visible from the astronomical observatory;
    receiving from the browser a selection by a user of a celestial object depicted in the interactive star chart, wherein the receipt of the selection comprises receiving from the browser an identifier that identifies the selected celestial object;
    resolving the identifier to a set of celestial coordinates at which the celestial object is located with respect to the astronomical observatory;
    controlling the components of the astronomical observatory to locate the celestial object at the set of celestial coordinates;
    controlling the components of the astronomical observatory to capture one or more images of the celestial object at the set of celestial coordinates; and
    transmitting the captured one or more images of the celestial object to the browser over the network.

2. The method of claim 1, wherein serving the interface comprises serving the interface such that the interface conveys a status of one or more of the components of the astronomical observatory while the components of the astronomical observatory locate the celestial object or capture the one or more images of the celestial object.

3. The method of claim 1, wherein serving the interface comprises serving the interface such that the interface conveys one or more ambient conditions of the astronomical observatory.

4. The method of claim 1, further comprising:
    accessing a history of one or more previously captured images of the celestial object; and
    transmitting at least one of the images from the history of one or more previously captured images of the celestial object to the browser to provide a frame of reference for the one or more capture images.

5. The method of claim 1, wherein the network comprises the Internet.

6. A computer-implemented method of controlling an astronomical observatory with components that include at least an astronomical telescope, an imaging camera, and an auto-guiding camera, the method comprising:
    serving, over a network to a browser, an interface;
    receiving, over the network from the browser, a command input at the interface by a user to manipulate one or more of the components of the astronomical observatory;
    determining a current measurement of one or more ambient conditions at the astronomical observatory;
    comparing the current measurement of the one or more ambient conditions with one or more predefined boundaries for the one or more ambient conditions;
    manipulating the components of the astronomical observatory in accordance with the received command if the current measurement of the one or more ambient conditions are within the one or more predefined boundaries for the one or more ambient conditions; and
    declining to manipulate the components of the astronomical observatory in accordance with the received command if the current measurement of the one or more ambient conditions are not within the one or more predefined boundaries for the one or more ambient conditions.

7. The method of claim 6, wherein at least one of the one or more predefined boundaries for the one or more ambient conditions are configured by a user.

8. The method of claim 7, wherein the at least one of the one or more predefined boundaries for the one or more ambient conditions are configured by the user via the interface.

9. The method of claim 6, wherein the one or more ambient conditions comprise one or more of wind speed, outside temperature, barometric pressure, humidity, or dew point.

10. The method of claim 6, wherein the network comprises the Internet.

11. The method of claim 6, further comprising shutting down one or more components of the astronomical observatory if the current measurement of the one or more ambient conditions are not within the one or more predefined boundaries for the one or more ambient conditions.

12. A computer-implemented method of controlling an astronomical observatory with components that include at least an astronomical telescope, an imaging camera, and an auto-guiding camera, the method comprising:

serving, over a network to a browser, an interface;

receiving from the browser a command to capture an image of a celestial object;

controlling the components of the astronomical observatory to capture one or more images of the celestial object through the telescope in accordance with the received command;

accessing a database that includes a history of one or more previously captured images of celestial objects;

locating at least one of the one or more previously captured images of the celestial object in the database; and transmitting the one or more captured images of the celestial object and the at least one of the one or more previously captured images of the celestial object to the browser over the network to provide a frame of reference against which the one or more captured images can be compared.

13. The method of claim 12, wherein the at least one of the one or more previously captured images of the celestial object that is transmitted to the browser was captured at a different astronomical observatory.

14. The method of claim 12, further comprising storing at least one of the one or more captured images of the celestial object in the database with the history of the one or more previously captured images of the celestial object.

15. The method of claim 12, wherein the database comprises a set of reference images that cover the night sky.

16. The method of claim 12, wherein the network comprises the Internet.

* * * * *